United States Patent Office 3,705,098
Patented Dec. 5, 1972

3,705,098
SEWAGE TREATMENT WITH HYDROGEN PEROXIDE
John Alexander Shepherd, Princeton, N.J., and Millice Floyd Hobbs, Monte Sereno, Calif., assignors to FMC Corporation, New York, N.Y.
No Drawing. Filed Feb. 22, 1971, Ser. No. 117,737
Int. Cl. C02c 1/40
U.S. Cl. 210—63                          3 Claims

ABSTRACT OF THE DISCLOSURE

In the treatment of sewage to remove odors and reduce corrosion in sewerage and treatment plants, sulfide and hydrogen sulfide are removed by oxidation with hydrogen peroxide.

BACKGROUND OF THE INVENTION

Field of the invention

This invention relates to a process for controlling sulfide and hydrogen sulfide in sewage in order to eliminate odors due to hydrogen sulfide and to reduce corrosion caused by oxides of sulfur resulting from sulfide oxidation.

Description of the prior art

Sulfates are contained in sea water and in waters which rise from, or pass through, sulfate-bearing strata in the earth or are drawn from streams into which sulfates are introduced as industrial wastes. When such sulfate-bearing waters enter sewerage (the lines used to transmit sewage) or sewage treatment systems by seepage, drainage, or other means, the sulfates are reduced to sulfides, with the evolution of hydrogen sulfide gas. This hydrogen sulfide production occurs from the action of sulfate-reducing anaerobic bacteria (e.g. *Desulfovibro desulfricans*) present in septic sewage and in sewer line slimes. Hydrogen sulfide above the liquid phase in gravity sewer lines may then be reoxidized by action of aerobic bacteria to sulfur trioxide, with subsequent formation of sulfuric acid. The presence of sulfuric acid results in heavy corrosion of metal and concrete sewer lines, concrete and metal structures, and metal equipment and machinery.

In addition to the costly damage to sewerage and treatment equipment, hydrogen sulfide in sewage creates a public nuisance because of its highly disagreeable odor at levels as low as 0.01 p.p.m. in the atmosphere. In warm coastal areas, where sewerage is particularly vulnerable to introduction of quantities of sulfates, the nuisance becomes especially aggravated. Further, breathing by humans of air containing as low as 10 p.p.m. of hydrogen sulfide for a short period can prove fatal; such accumulations are likely to occur in covered or domed clarifiers or settling tanks in treatment plants, or in manholes or wet wells in sewerage systems.

Although many treatments to control sewage hydrogen sulfide and avoid resultant sulfuric acid have been tried, none has been uniformly satisfactory or successful in both gravity systems and force main systems. Among those treatments used have been aeration, chlorination, ozonation, oxygenation, lime, sodium nitrate, activated carbon filtration, odor masking, and crotonaldehyde. It has been found, for example, that while one mol of chlorine gas is in theory capable of oxidizing one mol of sulfide or hydrogen sulfide, in the actual practice of this method five to seven times as much chlorine is required to control sulfide as stoichiometry predicts. Further, it has been found that attempts to sterilize the slimes coating the walls of sewerage with a massive dose of chlorine have failed, and sulfide formation has started again promptly (Richard Pomeroy and Fred D. Bowlus, "Progress Report on Sulfide Control Research," Sewage Works Journal 18, No. 4, pp. 597–640, July 1946). Periodic flushing of gravity lines to remove crown-accumulated sulfuric acid is practiced. However, this not only removes the sulfuric acid but also the scaling of the pipe caused by the acid and provides fresh surface for sulfuric acid attack, accelerating the corrosion process.

The oxidation of hydrogen sulfide by hydroven peroxide is well known, and a description of the mechanism by C. N. Satterfield, R. C. Reid and D. R. Briggs was published in The Journal of the American Chemical Society 76, pp. 3922–3, Aug. 5, 1954. The end product of this oxidation is colloidal sulfur and not the more highly oxidized and highly corrosive oxides of sulfur, sulfur dioxide or sulfur trioxide.

The susceptibility of peroxygen compounds to decomposition in the presence of various metal ions is well known, and the fear that peroxygen compounds introduced into a sewage system would be dissipated by metal-ion-catalyzed decomposition has possibly deterred such use.

SUMMARY OF THE INVENTION

It has now been found that sulfide and hydrogen sulfide in sewage and in sewage conduit and treatment systems are removed and easily controlled by a simple chemical treatment of the sewage and sewage system with hydrogen peroxide. With this method of treatment, nuisance-creating noxious odors are eliminated, lethal concentrations of hydrogen sulfide are avoided, and corrosive damage to sewerage, structures, and equipment is averted.

The decomposition of hydrogen peroxide in these systems, notwithstanding the presence of catalysts for the decomposition such as metal ions or enzymes such as catalase, is found to be slow relative to the reaction of hydrogen peroxide in oxidizing hydrogen sulfide. It is therefore possible continuously to maintain hydrogen sulfide at a level of 0.1 mg./liter or below in sewage (0.1 p.p.m. in air) with continuous hydrogen peroxide treatment which is not substantially in excess of the stoichiometric equivalent of hydrogen sulfide in the influent sewage.

DETAILED DESCRIPTION OF THE INVENTION AND THE PREFERRED EMBODIMENTS

In practice of the process of the present invention, soluble sulfide and hydrogen sulfide in public sewage are controlled by treatment of the sewage with hydrogen peroxide, (a) using a "slug" dosage of hydrogen peroxide to precondition the system, which dosage consists of four to ten times the stoichiometric equivalent of sulfide and hydrogen sulfide in the influent sewage for a period of time sufficient to lower the sulfide and hydrogen sulfide level essentially to zero, and (b) thereafter maintaining sulfide and hydrogen sulfide at or near zero by continued introduction of hydrogen peroxide into the flowing system at a rate essentially stoichiometrically equivalent to the sulfide and hydrogen sulfide in the influent sewage.

The hydrogen peroxide is introduced at a point in the sewerage or the treatment system where it can become thoroughly mixed with the sewage in order to effect contact with the sulfide and hydrogen sulfide which is being oxidized. This may be at the beginning of gravity or force main sewerage, or at the entrance to a lift station or treatment plant, or as the sewage enters a settling tank, or at any other point at which hydrogen sulfide odors and corrosion are known to create a nuisance, and where it is therefore desired to effect sulfide and hydrogen sulfide oxidataion.

The rate of sewage flow and the level of hydrogen sulfide and sulfide ion it contains are determined, and a rate of introduction of hydrogen peroxide is selected which is appropriate for the level of sulfide and hydrogen sulfide it is necessary to control. Introduction may be continuous or intermitent. It is usually continuous when sewage is flowing continuously, and intermitent in force main systems or lift stations where sewage pumps operate intermittently. To effect intermittent introduction of hydrogen peroxide, the pump used to convey the hydrogen peroxide to the system can be linked to the sewage pump, so it operates only when sewage is being pumped.

One pound of hydrogen peroxide, 100% basis, oxidizes one pound of hydrogen sulfide to elemental sulfur. Treatment of sewage is started with four to ten pounds, preferably seven to ten pounds, of hydrogen peroxide per pound of sulfide and hydrogen sulfide present in the influent sewage in order to precondition the system. This preconditioning process is believed to destory sulfur-reducing bacteria present in the accumulated slimes on the walls of sewerage and treatment equipment, which if not destroyed would regenerate hydrogen sulfide after it had been oxidized by the hydrogen peroxide. This "slug" dosage for conditioning the system is maintained for a period of time sufficient to lower the hydrogen sulfide level essentially to zero. This will require at least as long a time as the average residence time of sewage in the segment or unit of the system being treated, and is usually continued for a longer period. Treatment can be continued for up to ten times the average residence time in sewerage. The period of preconditioning in sewerage is extended because the ratio of slime-bearing surfaces to total volume is substantially greater in sewerage than it is in large-volume vessels used for treatment or settling.

Commercially available 35% or 50% hydrogen peroxide is employed in carrying out the present process; higher or lower concentrations of hydrogen peroxide may be used, convenience and availability determining the choice. None of these is corrosive to metal or ceramic or other materials encountered in the sewage system. The end products of the oxidation, sulfur and water, are nontoxic.

Following the initial "slug" treatment for conditioning, the rate of hydrogen peroxide introduction is reduced to a level which corresponds to one to two times the stoichiometric equivalent of hydrogen sulfide (or sulfide) present in the incoming raw sewage. At a level two times the hydrogen sulfide equivalent, qualitative tests for residual hydrogen peroxide were positive in the effluent from the treatment system, the settling tank, and the force main sewerage. This indicates that the decomposition of hydrogen peroxide under the influence of metal ions and enzymes which may be present in the system is slow relative to the reaction of hydrogen peroxide in oxidizing the sulfide to elemental sulfur. Not surprisingly, residual hydrogen peroxide was not detected when only one stoichiometric equivalent of hydrogen peroxide per equivalent of hydrogen sulfide was used. It is thus seen that, after the initial "slug" treatment to condition the system, a quantity of hydrogen peroxide sufficient to oxidize the hydrogen sulfide, plus a slight excess of hydrogen peroxide to compensate for destruction of hydrogen peroxide by slower catalytic reactions which may occur, maintains the system essentially free of sulfide and hydrogen sulfide in the sewage slurry, and of hydrogen sulfide in the atmosphere above the sewage; this excess is ordinarily less than a second stoichiometric equivalent of hydrogen peroxide.

In a direct comparison between chlorine and hydrogen peroxide treatment for hydrogen sulfide removed in the same sewage treatment plant, it was found that treatment with chlorine stoichiometrically equivalent to the hydrogen sulfide present (2.1 lb. $Cl_2$ per lb. $H_2S$) did not control hydrogen sulfide completely, and that one equivalent of hydrogen peroxide showed better hydrogen sulfide control in this system.

In force main sewerage, aeration with air or oxygen-enriched air or oxygen can be employed to oxidize hydrogen sulfide because the conduits are filled with sewage; aeration is infeasible in gravity sewerage, as the conduits are not filled with sewage, and aeration therefore drives hydrogen sulfide from sewage into the free space above the sewage, leaving oxidation incomplete and increasing odors. Even in force main sewerage employing aeration, however, oxidation capacity is limited by the capacity of the aeration system to move air into the system, and hydrogen sulfide is not completely removed when it is present at levels beyond this oxidation capacity. By the process of the present invention, following the initial "slug" treatment with hydrogen peroxide to condition the system, the hydrogen sulfide in force main sewerage employing aeration is reduced essentially to zero by using less than stoichiometric quantities of hydrogen peroxide in addition to the aeration. From one-fourth to one times the stoichiometric equivalent is ordinarily required in addition to the aeration. Hydrogen peroxide alone would also be effective, but for force main systems which have aeration equipment in place, the use of hydrogen peroxide in quantity sufficient to complete the sulfide oxidation is advantageous.

The following examples are included by way of illustration of the present invention and are not to be deemed limitative thereof. Hydrogen peroxide treatment is recorded on a 100% basis.

EXAMPLE 1

In a municipal sewage pumping station with flow of 0.3 to 0.4 million gallons per day of sewage, containing up to 6 mg. per liter of sulfide as $S^=$, 35% hydrogen peroxide solution was introduced at the beginning of the force main at controlled flow rates by means of a positive displacement pump. Samples were withdrawn at five points in the gravity flow sewerage 5,987 to 11,362 feet beyond the point of hydrogen peroxide introduction (400 to 5,375 feet beyond the end of the force main). Appropriate analyses were performed in the field immediately upon withdrawal of the sewage samples, utilizing the colorimetric methylene blue method for total sulfide ("Standard Methods for the Examination of Water and Waste Water," 11th ed., American Public Health Association, Inc., New York, 1960, pp. 332–5) and quantitative lead acetate methods for dissolved hydrogen sulfide and hydrogen sulfide gas. The force main pumps in the pumping station operated intermittently on demand, and the hydrogen peroxide addition pump was synchronized with the running of the sewage pumps. Under the intermittent operation, sewage required approximately 108 minutes to move from the pumping station to the first sampling point. Thus the effect of the hydrogen peroxide would be expected to be observable at this sampling point approximately two hours after addition at the pumping station. Analytical results were obtained before initiation of hydrogen peroxide addition, and during successive periods of hydrogen peroxide treatment: 13 mg./liter for four hours; 43 mg./liter for 21 hours of "slug" dosage to condition the system; 10, 15, 20, and 10 mg./liter for four days in aggregate; and during 24 hours of subsequent operation with no treatment. Determinations of total sulfide (hydrogen sulfide during latter stages of the run) are recorded in Table 1. In addition to these results, qualitative tests with titanium sulfate confirmed the presence of residual hydrogen peroxide in the sewerage system at the first sampling point in the gravity system, 400 feet beyond the end of the force main. Sewage temperature ranged from 75° to 86° F. and pH was 6–7, except when surges of commercial laundry effluent raised the pH briefly to 8; this was observed twice during the week of the test, although it no doubt occurred several other times. Once during the week, the pH dropped to 5 as a result of an unidentified acid effluent.

It is seen that an initial hydrogen peroxide treatment of 13 mg./liter was not effective in lowering sulfide levels in the sewage, so the dosage of hydrogen peroxide was increased to 43 mg. per liter to condition the system. After this "slug" dosage had lowered sulfide to 0.1 mg./liter, or less, lower levels of hydrogen peroxide treatment were effective in maintaining the sulfide substantially below that present in untreated sewage, even to the fifth sampling point, 5,375 feet beyond the end of the force main. When treatment was terminated, sulfide levels returned to 5 mg./liter.

TABLE 1.—RESULTS FROM EXAMPLE 1

| Day | Time | $H_2O_2$ feed, mg./liter | Sulfide in sewage, mg./liter | | |
|---|---|---|---|---|---|
| | | | Untreated | Sampling point | |
| | | | | First | Fifth |
| 1 | 0930 | | 2.4 | | |
| | 1015 | 13 | | | |
| | 1035 | | | 2.8 | |
| | 1130 | | | | 6.0 |
| | 1345 | | 5.7 | | |
| | 1415 | | | 3.0 | |
| | 1500 | 43 | | | |
| | 1630 | | | 2.4 | |
| | 1655 | | | 1.1 | |
| | 1710 | | | 0.5 | |
| | 1730 | | | 0.4 | |
| 2 | 0820 | | 3.4 | | |
| | 0845 | | | <0.1 | |
| | 1005 | | | | 0.3 |
| | 1030 | | | 0.1 | |
| | 1200 | | 4.8 | | |
| | 1215 | 10 | | | |
| | 1315 | | | <0.1 | |
| | 1330 | | | 3.0 | |
| | 1400 | | | 0.1 | |
| | 1430 | | | 0.3 | |
| | 1500 | 15 | 3.0 | | |
| | 1600 | | | 1.4 | |
| | 1630 | | | 1.1 | |
| | 1645 | | | 0.8 | |
| | 1700 | | | 1.2 | |
| | 1750 | 20 | | | |
| 3 | 0745 | | 1.2 | | |
| | 0810 | | | 0.3 | |
| | 0840 | | | 0.2 | |
| | 1000 | | 0.8 | | |
| | 1115 | | 1.4 | | |
| | 1250 | | 2.8 | | |
| | 1350 | | | 0.8 | |
| | 1445 | | 2.4 | | |
| | 1455 | | | 0.3 | |
| 4 | 0800 | | | 0.1 | |
| | 0845 | | | | 0.5 |
| | 1400 | | | | 2 |
| | 1420 | | | 0.5 | |
| | 1600 | 10 | | | |
| 5 | 0800 | | | 0.3 | |
| | 1400 | | | 0.1 | |
| 6 | 1000 | | | 0.3 | |
| | 1400 | 0 | | 0.5 | |
| 7 | 1330 | | 5 | | |
| | 1345 | | | | 5 |

EXAMPLE 2

In a municipal sewage station with flow of approximately 1.8 million gallons per day of sewage, containing up to 6 mg./liter of hydrogen sulfide, 35% hydrogen peroxide solution was introduced at controlled flow rates by means of a positive displacement pump into the comminutor inlet at the entrance to the station. Thorough mixing was effected in the comminutor and through the wet well pumps, after which sewage entered the clarifier, in which the residence time was 1.5 to 2.0 hours; from the clarifier, the sewage passed to the force main wet well, whence it was pumped to the point of outfall. Samples of untreated sewage were withdrawn from the manhole immediately ahead of the comminutor, and samples of treated sewage were withdrawn from the clarifier, and from the force main wet well. Analyses for total sulfides were run on the sewage and for hydrogen sulfide on the atmosphere above the sewage. Treatment with 35% hydrogen peroxide solution was started at a "slug" dose rate of 50 mg./liter in order to condition the system, and after two to three clarifier residence times at this rate (4.5 hours), the rate of addition was substantially reduced to 20 mg./liter, and 22.5 hours later to 15 mg./liter. After 4.5 hours, when the operation had stabilized at this rate, the rate of addition was reduced to 10 mg./liter, and 25 hours later it was lowered to 5 mg./liter, just before the hydrogen peroxide supply was exhausted. Hydrogen peroxide residuals were present at the force main wet well throughout the run, and sulfide data gathered during the 65 hours of the run are recorded in Table 2. Sewage temperature ranged from 83° to 86° F. and pH during the treatment was 6–7.

It is seen that the sulfide in sewage was reduced from levels of 3.5 to 5.8 mg./liter to 0 to 0.3 mg./liter, and hydrogen sulfide in the atmosphere above the sewage from 12 p.p.m. to a "trace" or zero, using as little as 5 mg./liter of hydrogen peroxide.

TABLE 2.—RESULTS FROM EXAMPLE 2

| Day | Time | $H_2O_2$ feed, mg./liter | Untreated | | Clarifier | | Force main wet well | |
|---|---|---|---|---|---|---|---|---|
| | | | Sulfide, mg./liter | Atm. $H_2S$, p.p.m. | Sulfide, mg./liter | Atm. $H_2S$, p.p.m. | Sulfide, mg./liter | Atm. $H_2S$, p.p.m. |
| 1 | 1530 | 0 | 3.8 | 2 | | | | |
| | 1600 | 0 | | | | | 4.0 | 6 |
| | 1630 | 0 | | | 4.0 | 12 | | |
| | 1730 | 50 | | | | | | |
| | 2200 | 20 | | | | | | |
| 2 | 0830 | 15 | | | | | | |
| | 0845 | 15 | | | 0.2 | Trace | | |
| | 0900 | 15 | | | | | 0 | 0 |
| | 0945 | 15 | 3.5 | 2 | | | | |
| | 1045 | 15 | | | 0.1 | 0 | | |
| | 1115 | 15 | | | | | 0 | 0 |
| | 1130 | 15 | 4.2 | Trace | | | | |
| | 1300 | 10 | | | | | | |
| | 1330 | 10 | 4.5 | Trace | | | | |
| | 1345 | 10 | | | 0.1 | 0 | | |
| | 1405 | 10 | | | | | 0.1 | 0 |
| | 1530 | 10 | 4.3 | Trace | | | | |
| | 1545 | 10 | | | Trace | 0 | | |
| | 1605 | 10 | | | | | 0.1 | Trace |
| 3 | 0800 | 10 | | | 0 | 0 | | |
| | 0815 | 10 | | | | | 0 | 0 |
| | 0830 | 10 | 5.3 | Trace | | | | |
| | 1400 | 5 | | | 0.3 | Trace | | |
| | 1415 | | | | | | 0.3 | Trace |
| | [1] 1430 | 0 | 5.8 | Trace | | | | |
| 4 | 0815 | 0 | | | 5.5 | 12 | | |

[1] $H_2O_2$ supply exhausted and no more additions were made.

EXAMPLE 3

In a municipal sewage treatment plant with a flow rate of 2.9 million gallons per day of sewage, chlorine had been used for odor and sulfide control for 13 years. This permitted a direct comparison of the effectiveness f hydrogen peroxide with the effectiveness of chlorine for hydrogen sulfide control. Hydrogen peroxide, 50% solution, was introduced at controlled flow rates by means of a positive displacement pump into the untreated sewage just before it entered the primary settling tank, very close to the point at which chlorine is introduced in ordinary operation. Samples of untreated sewage and of the primary effluent from the settling tank, in which the average residence time is 2.5 to 6 hours, were withdrawn and analyzed immediately for total sulfide. The atmosphere above the effluent trough was analyzed for hydrogen sulfide. These analytical data were gathered under normal operating conditions with chlorine treatment at 11 mg./liter (260 lb. per day), with no treatment, and during hydrogen peroxide treatment ranging from an initial "slug" dosage of 36 mg./liter for 7 hours, down to 10, 5, and 7.5 mg./liter aggregating 33 hours, followed by a second period of no treatment, and resumption of chlorine treatment at 11, 13, and 15 mg./liter (260, 300 and 360 lb./day). No residual chlorine was detected in the effluent by the ortho-tolidine test during periods of chlorine addition, but residual hydrogen peroxide was present in the effluent during hydrogen peroxide treatment, except at the lowest level of hydrogen peroxide treatment. Sulfide results are recorded in Table 3. Sewage temperature ranged from 79° to 84° F. and pH was 7.1–8.4 during the test run.

These results show that after conditioning with hydrogen peroxide, treatment with 5 to 7.5 mg./liter of hydrogen peroxide held sulfide in sewage between 0.1 and 1.2 mg./liter, and atmospheric hydrogen sulfide between 0 and 2 p.p.m. This was better control than was obtained by treatment with chlorine at 11 and 13 mg./liter, during which sulfide in sewage ranged from 0.8 to 3.5 mg./liter, and atmospheric hydrogen sulfide from 3 to 12 p.p.m. Sewage receiving neither treatment showed sulfide levels of 2.4 to 5.2 mg./liter, and atmospheric hydrogen sulfide reached 20 p.p.m.

TABLE 3.—RESULTS FROM EXAMPLE 3

| Day | Time | Treatment | Untreated sewage, total S=, mg./liter | Primary settler effluent Total S=, mg./liter | Primary settler effluent Atm. H₂S, p.p.m. |
|---|---|---|---|---|---|
| 1 | 1130 | Cl₂ 11 mg./liter | 1.4 | 0.8 | 3 |
|   | 1330 |  | 2.7 | 1.8 | 4 |
|   | 1440 |  | 4.4 | 2.5 | 5 |
|   | 1615 |  | 3.5 | 3.5 | 7 |
|   | 1700 | Cl₂ shut off |  |  |  |
|   | 2030 | No treatment | 3.3 | 5.2 | 20 |
|   | 2200 |  | 3.4 | 5.0 | 18 |
|   | 2240 |  |  |  | 20 |
| 2 | 0700 |  | Trace | Trace | 1 |
|   | 1015 |  | 2.8 | 2.4 | 2 |
|   | 1130 |  | 2.4 |  | 9 |
|   | 1330 |  | 3.4 | 4.0 | 11 |
|   | 1430 |  | 3.0 | 3.5 | 9 |
|   | 1530 |  | 4.4 | 4.2 | 10 |
|   | 1600 | H₂O₂ 36 mg./liter |  |  |  |
|   | 1700 |  | 3.0 | 0.9 | 6 |
|   | 2015 |  | 3.8 | 0.3 | 7 |
|   | 2215 |  | 5.4 | 0.4 | 5 |
|   | 2300 | H₂O₂ 10 mg./liter |  |  |  |
| 3 | 0700 |  | 1.4 | 0.1 | 6 |
|   | 0800 |  | 1.4 | 0 | 0 |
|   | 0830 | H₂O₂ 5 mg./liter |  |  |  |
|   | 0900 |  | 1.8 | 0.1 | 0 |
|   | 1000 |  |  | 0.2 | 0 |
|   | 1115 |  | 2.0 | 0.5 | Trace |
|   | 1345 |  | 1.4 | 1.0 | Trace |
|   | 1445 |  | 2.3 | 0.5 | Trace |
|   | 1530 |  | 1.4 | 0.8 | 1 |
|   | 1800 |  | 1.6 | 1.2 | 1 |
|   | 1830 | H₂O₂ 7.5 mg./liter |  |  |  |
|   | 2130 |  | 2.9 | 0.9 | 2 |
| 4 | 0730 |  | 0.9 | 0.1 | 0 |
|   | 0815 |  | 0.9 |  | 0 |
|   | 0830 | H₂O₂ shut off |  |  |  |
|   | 1120 | No treatment | 2.2 | 2.2 | 4 |
|   | 1300 |  | 2.6 | 2.7 | 6 |
|   | 1430 |  | 2.8 | 3.2 | 6 |
|   | 1500 | Cl₂ 11 mg./liter |  |  |  |
|   | 1730 |  | 3.0 | 2.0 | 5 |
|   | 2000 | Cl₂ 13 mg./liter |  |  |  |
|   | 2045 |  | 2.8 | 3.4 | 12 |
|   | 2115 | Cl₂ 15 mg./liter |  |  |  |
| 5 | 0715 |  | 0.7 | 0.1 | Trace |
|   | 0830 |  | 1.6 | Trace | Trace |

EXAMPLE 4

In another experiment in the force main system used in Example 1 above at a time when sewage sulfide was running 5 to 16 mg./liter, and hydrogen sulfide in the atmosphere above the sump from which sewage was pumped into the force main was 5 to 70 p.p.m., it was again demonstrated that after preconditioning the system with "slug" dosage of hydrogen peroxide, the hydrogen sulfide level in the sewage was held near zero levels with approximately one pound of hydrogen peroxide (100% basis) per pound of hydrogen sulfide in the sewage.

When hydrogen peroxide introduction was discontinued, and air was injected into this preconditioned force main system at a rate of 28 c.c.f.m. (standard cubic feet per minute), sulfide levels were reduced partially, from a range of 9 to 18 mg./liter in the influent sewage, to a range of 2 to 10 mg./liter in the sewage emerging from the force main, and high levels of hydrogen sulfide remained in the atmosphere at the sampling point beyond the end of the force main. The aeration was supplemented by resuming hydrogen peroxide introduction at approximately one-half pound per pound of hydrogen sulfide in the influent sewage, and this effected a prompt reduction in both sewage sulfide and atmospheric hydrogen peroxide to zero levels. Control of hydrogen sulfide was maintained for an additional six days with this combination of air and hydrogen peroxide.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specificaly described and exemplified herein.

We claim:
1. The process of treating untreated sewage, containing sulfide and hydrogen sulfide, flowing through sewerage systems prior to sewage treatment, with hydrogen peroxide in order to oxidize sulfide and hydrogen sulfide and control their regeneration or recurrence, and thereby to remove odors caused by hydogen sulfide and reduce corrosion caused by oxides of sulfur, which comprises (a) as a preconditioning treatment, introducing hydrogen peroxide into the influent sewage in the amount of four to ten times the stoichiometric equivalent of sulfide and hydrogen sulfide in the influent sewage for a period of time sufficient to reduce the sulfide and hydrogen sulfide to essentially zero level, and (b) thereafter continuously maintaining the sulfide and hydrogen sulfide at essential- ly zero level by introducing hydrogen peroxide into the influent sewage in the amount of one to two times the stoichiometric equivalent of sulfide and hydrogen sulfide in the influent sewage.

2. Process of claim 1 in which the preconditioning treatment consists of introducing hydrogen peroxide into the sewage in the amount of seven to ten times the stoichiometric equivalent of sulfide and hydrogen sulfide in the influent sewage.

3. Process of claim 1 wherein following the preconditioning treatment with hydrogen peroxide, sulfide and hydrogen sulfide are continuously maintained at essentially zero level by introducing hydrogen peroxide into the sewage in the amount of one-fourth to one times the stoichiometric equivalent of sulfide and hydrogen sulfide in the influent sewage, while aerating the system with air or oxygen-enriched air or oxygen.

References Cited

UNITED STATES PATENTS

| | | | |
|---|---|---|---|
| 2,809,933 | 10/1957 | Halvorson | 210—150 X |
| 3,525,685 | 8/1970 | Edwards | 210—15 |
| 3,335,082 | 8/1967 | Ullrich | 210—15 |
| 3,388,057 | 6/1968 | Callahan | 210—63 |
| 3,530,067 | 9/1970 | Friedman | 210—15 |

OTHER REFERENCES

Satterfield, C. N., et al., J. Am. Chem. Soc., vol. 76, Aug. 5, 1954, pp. 3922–3923 (P.O.S.L.).

MICHAEL ROGERS, Primary Examiner

U.S. Cl. X.R.

210—18